United States Patent Office 3,606,915
Patented Sept. 21, 1971

3,606,915
DEVICE FOR TRIMMING FELLED TREES
Karl Thore Lindblom, Alfta, Sweden, assignor to Ostbergs Fabrika AB, Alfta, Sweden
Filed Sept. 2, 1969, Ser. No. 854,460
Int. Cl. A01a *3/00;* B271 *1/06;* B27m *1/00*
U.S. Cl. 144—2          2 Claims

ABSTRACT OF THE DISCLOSURE

A device for delimbing felled trees including a pair of shear knives which are axially displaced with respect to each other and are adapted to embrace a tree to be delimbed. The shear knives have an arc-shaped cross-section and operate in the axial direction, each knife comprising two portions connected by a central joint, which portions define a semi-circle in the rest portion of the device. The two portions are movable toward and away from each other in a vertical plane common to the joints and there are provided means for controlling the movements of the joints and the rotational movements of the knife portions.

---

This invention relates to a device for trimming felled trees. It is based on the observation that the time required for mechanical trimming varies somewhat with the thickness of the tree trunk. In consideration of the fact that the trimming time represents a relatively large part of the total working time, which latter in its turn is desired to be as much as possible in a constant relationship with the volume of the wood worked, it obviously is not rational to invest approximately as much time and machine power for the trimming of thin trunks as for the trimming of thick ones.

A remarkable improvement in this respect is obtained in that the trimming device according to the invention is characterized in that it comprises an overlying and an underlying shear knife with axial operation direction which in non-operative position has a substantially semi-circle arc cross-section, each of said knives comprising two circle arc segment portions connected by a central joint, said two joints being adapted to be moved to and from each other in the vertical plane common to said joints, means being provided for so controlling the joint movement as well as the pivotal movements of the knife parts that the two knives can be used either for enclosing (and trimming) with substantially maintained semicircle arc shaped cross-section a single tree trunk of greater thickness or with outwardly pivoted arc segment portions to enclose two tree trunks of a smaller thickness.

Figure 1:
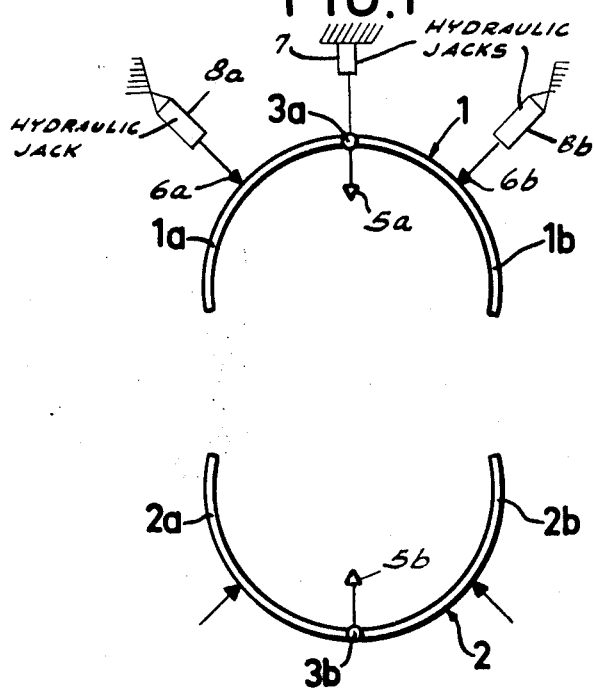
Figure 2:
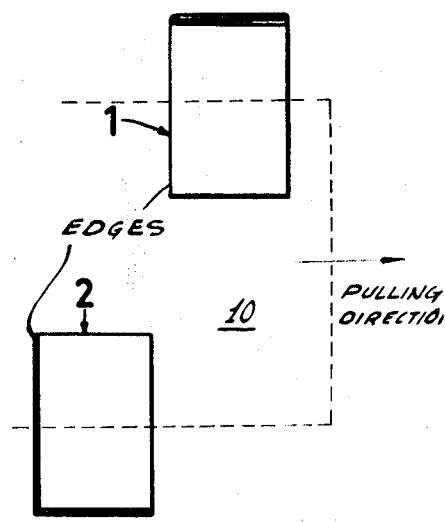
Figure 3:
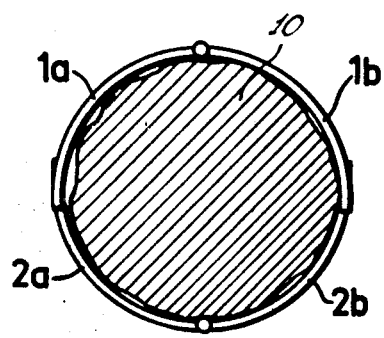
Figure 4:
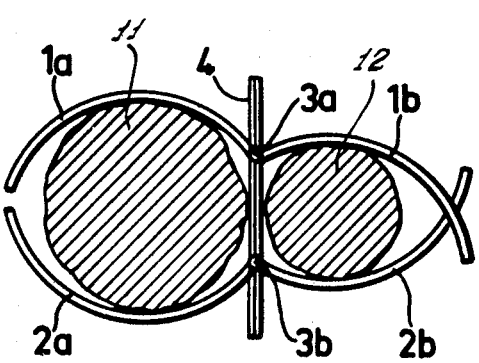

The invention is described in greater detail in the following, with reference to the accompanying drawing in which FIGS. 1 and 2 show in a schematic way front and side views, respectively, of the arrangement according to the invention, and FIGS. 3 and 4 show respectively front views of the arrangement for illustrating its various fields of application.

FIG. 1 shows two shear knives 1 and 2 with circle arc shaped cross-section, each knife extending a full length of a semicircle. In the selected embodiment the knives are axially entirely displaced relative one another, as is evident from the lateral view shown in FIG. 2. Each of the knives is symmetrically divided into two circle arc segment portions 1a, 1b and 2a, 2b, respectively, via a central joint 3a and 3b, respectively. The two unfilled arrows 5a and 5b in FIG. 1 are intended to show that the two joints 3a and 3b carrying the respective knives are adapted (hydraulically) to be driven towards each other, the filled arrows 6a and 6b symbolizing (hydraulic) forces adapted to be applied from the outside. In FIG. 1 hydraulic jack 7 is shown in association with arrow 5a, it being understood that a like means (not shown) is associated with arrow 5b. Likewise, at 8a and 8b there are indicated conventional hydraulic jacks for pivoting the knife portions 1a and 1b about central joint 3a, it being understood that like means (not shown) are associated with knife portions 2a and 2b about joint 3b.

When a trunk of greater thickness is to be trimmed, which normally also has branches of a greater thickness, the two knives 1 and 2 are moved from the non-operative or starting position shown in FIG. 1 (and 2) towards each other so as to enclose a thick trunk 10 in the way shown in FIG. 3 whereafter the trunk in the usual way is drawn through the knives for trimming. In this case the total tractional force available can be utilized for this single thick trunk with its correspondingly thick branches.

When, however, three trunks of a smaller thickness are to be trimmed, two such trunks can be placed in parallel on the lower knife 2 whereby the forces applied according to the arrows in FIG. 1 cause the knife parts 1a–1b, 2a–2b to swing outwardly about the joints 3a and 3b, respectively, thereby effecting a self-centering and substantially full enclosing of each of two trunks 11 and 12, as appears from FIG. 4, with the exception of the distance proper between the joints 3a and 3b where apparently none of the knife portions has any effect. In order to ensure the cutting of limbs (branches) found in this area, according to FIG. 4 a straight shear knife 4 is momentarily introduced into the vertical plane extending through the joints, in a place before the knife assembly (i.e. closer to the incoming limbs than to the knife assembly). Owing to the fact that the two thinner trunks 11 and 12 normally also have branches of a correspondingly smaller thickness, the requirements with respect to available tractional force are substantially the same, but the trimming capacity in this case will be twice as high compared with the conventional method of also trimming thin trunks only one at a time. The expert can modify the invention within its scope in different ways. It is not necessary, for example, that the two knives 1 and 2 have the axial displacement shown in FIG. 2, even if this displacement contributes to the flexibility by the possibility of overlapping as demonstrated in the right-hand half of FIG. 4. The straight shear knife 4 in FIG. 4, furthermore, may be replaced by another suitable cutting tool.

I claim:

1. A device for delimbing felled trees, comprising a pair of shear knives axially displaced and adapted to overlie and underlie, respectively, a tree to be delimbed, and having a substantially circular arc-shaped cross-section and operable in the axial direction, each knife comprising two circular arc segment portions connected by a central joint, said portions defining a semicircle in rest position, the two joints being movable to and from each other in a vertical plane common to said joints; means for controlling the movements of the joints as well as the rotational movements of the knife portions, whereby the two knives, while maintaining their substantially semi-circular cross-section, may enclose and delimb one single tree trunk of a greater thickness, and while having said arc segment portions rotated outwardly, enclose and delimb two trunks of a smaller thickness simultaneously.

2. The device according to claim 1, wherein a straight shear knife is insertable along said vertical plane common to the two joints and at a position in advance of the entrance of a tree trunk between the knives.

References Cited

UNITED STATES PATENTS

| 3,183,949 | 5/1965 | Larson | 144—2(21) |
| 3,498,350 | 3/1970 | Maradyn | 144—2(21)X |

DONALD R. SCHRAN, Primary Examiner

U.S. Cl. X.R.

144—208